United States Patent [19]
Imelmann et al.

[11] 3,711,217
[45] Jan. 16, 1973

[54] DRILL WITH A HARD METAL INSERT

[75] Inventors: Wilfried Imelmann, Vaduz; Siegfried Benedic, Eschen, both of Liechtenstein

[73] Assignee: Hilti Aktiengesellschaft, Schaan, Liechtenstein

[22] Filed: June 10, 1971

[21] Appl. No.: 151,823

[30] Foreign Application Priority Data

June 12, 1970 Germany.....................P 20 29 047.5

[52] U.S. Cl. ...................408/226, 408/144, 408/229
[51] Int. Cl. ...........................................B23b 51/00
[58] Field of Search......408/144, 199, 226, 227, 229, 408/56, 59, 57

[56] References Cited

UNITED STATES PATENTS 2,360,385  10/1944  Anderson..............................408/59

Primary Examiner—Francis S. Husar
Attorney—Toren and McGeady

[57] ABSTRACT

For obtaining the maximum effectiveness from an axially extending drill with a hard metallic insert positioned on its drill end and a pair of axially extending oppositely spaced surfaces formed in its cylindrically shaped shaft, the ratio of the maximum diameter of its shaft to the dimension between the oppositely disposed surfaces is in the range of 1 : 0.7 to 1 : 0.8.

2 Claims, 3 Drawing Figures

PATENTED JAN 16 1973 3,711,217

INVENTORS
WILFRIED IMELMANN
SIEGFRIED BENEDIC

BY Torem and McGeady
ATTORNEYS

DRILL WITH A HARD METAL INSERT

SUMMARY OF THE INVENTION

The present invention is directed to a drill having a hard metallic insert positioned on its drill end and a pair of oppositely disposed surfaces formed in the cylindrical shaft of the drill and, more particularly, it is directed to the dimensional relationship between the diameter of the cylindrical shaft and the spacing between the oppositely disposed surfaces on the shaft.

Drills are known which have axially extending curved or plane surfaced grooves extending along the drill shaft from its drill end to its shank end for discharging the cuttings or drillings from the drill end to the shank end of the drill. Such drills have the disadvantage that the cross-section of the drill is considerably weakened by the continuous grooves formed along the drill shaft, particularly adjacent to the highly stressed drill head, so that the effective or useful life of such a drill is relatively short. To overcome this disadvantage, drills have been formed where the grooves are provided only in the shaft part of the drill while its head has a full circular cross-section. In such an arrangement, the drill head is not weakened as indicated above, however, since the discharge of the drillings along the shaft is made more difficult because of the absence of the grooves at the drill head, the use of such a drill results not only in a reduced output but also in considerable heating of the drill head. The overheating of the drill head has a harmful effect on the soldered seam of the hard metallic insert.

Accordingly, the primary object of the present invention is to provide a drill which can be economically mass-produced while avoiding the above-mentioned disadvantages.

Therefore, in accordance with the present invention, when using a drill with a hard metallic insert positioned on its drill head or end, the groove surfaces along the drill shaft are formed so that the relationship between the diameter of the shaft to the dimension between the groove surfaces has a ratio in the range of 1 : 0.7 to 1 : 0.8.

In the above range which affords the optimum ratio between the drill shaft diameter and the spacing of its groove surfaces, the ratio is limited, on one hand, by the weakening of the drill shaft if a lesser groove surface spacing is employed and, on the other hand, by an insufficient discharge of the drillings if a greater spacing between the groove surfaces is used. Furthermore, a drill dimensioned within the range of the ratios set forth above has shown an increase in output as compared to known drills.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE INVENTION

Figure 1:
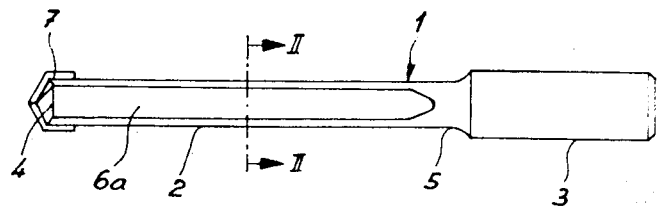
FIG. 1 is an elevational view of a drill formed in accordance with the present invention.
Figure 2:
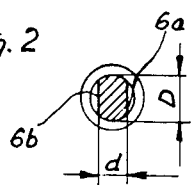
FIG. 2 is a section taken along line II—II in FIG. 1.

In FIG. 1 a drill 1 is shown formed of an axially extending cylindrically shaped shaft 2 having a drill head end 4 and a shank end 5 with a shank 3 extending axially from the shank end. In the cylindrical shaft 2 a pair of oppositely disposed symmetrically arranged plane surfaces 6a, 6b are provided which extend from the drill head end 4 to the shank end 5. As can be noted in FIG. 2, the plane surfaces 6a and 6b are in parallel relationship and are spaced apart by the dimension $d$. At the head end 4 of the drill, a hard metallic insert 7 is positioned and the construction of the insert and that of the drill head end is of a known type.

Figure 3:
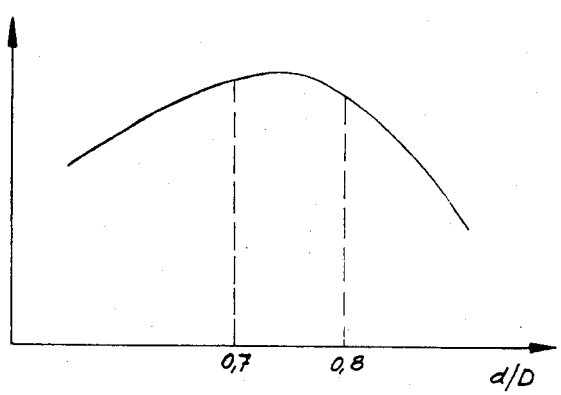
FIG. 3 is a graphic representation of the effective use of a drill formed in accordance with the present invention.

In FIG. 3 the results of tests are indicated showing the effectiveness of a drill compared with the relationship between the diameter D of the cylindrical shaft and the dimension or thickness $d$ between the plane surfaces of the grooves in the cylindrical shaft. In the graphic representation in FIG. 3, the ordinate indicates the effectiveness of the drill, that is a factor representing the drilling output and useful life of the drill, and the abscissa represents the ratio between the thickness or spacing $d$ of the groove surfaces and the diameter D of the shaft. The curve in FIG. 3 clearly shows that the optimum drill shaft dimensions prevail in the range of the ratio of $d/D$ between 0.7 and 0.8. If the ratio or value $d/D$ is greater than 0.8, that is, the spacing between the groove surfaces increases, it becomes considerably more difficult to discharge the drillings along the length of the drill shaft. As a result, the drill output diminishes, the drill becomes overheated, and the soldered seam of the metallic insert becomes damaged. When the ratio falls below 0.7, the thickness dimension of the shaft between the groove surfaces is so small that the drill head becomes weakened and its useful lifetime is substantially shortened.

While a specific embodiment of the invention has been shown and described in detail to illustrate the application of the inventive principle, it will be understood that the invention may be embodied otherwise without departing from such principles.

What is claimed is:

1. An axially extending drill having a substantially cylindrically shaped shaft with a drill end and and shank end, a hard metallic insert positioned on the drill end of said shaft, a pair of oppositely disposed surfaces symmetrically arranged in said shaft and extending between the drill end and the shank end thereof, the dimension between said surfaces being less than the diameter of said shaft, wherein the improvement comprises that the ratio of the maximum diameter of said shaft to the dimension between the oppositely disposed said surfaces is in the range of 1 : 0.7 to 1 : 0.8.

2. An axially extending drill, as set forth in claim 1, wherein said surfaces being planar and extending in parallel relationship to one another.

* * * * *